Figure 1:
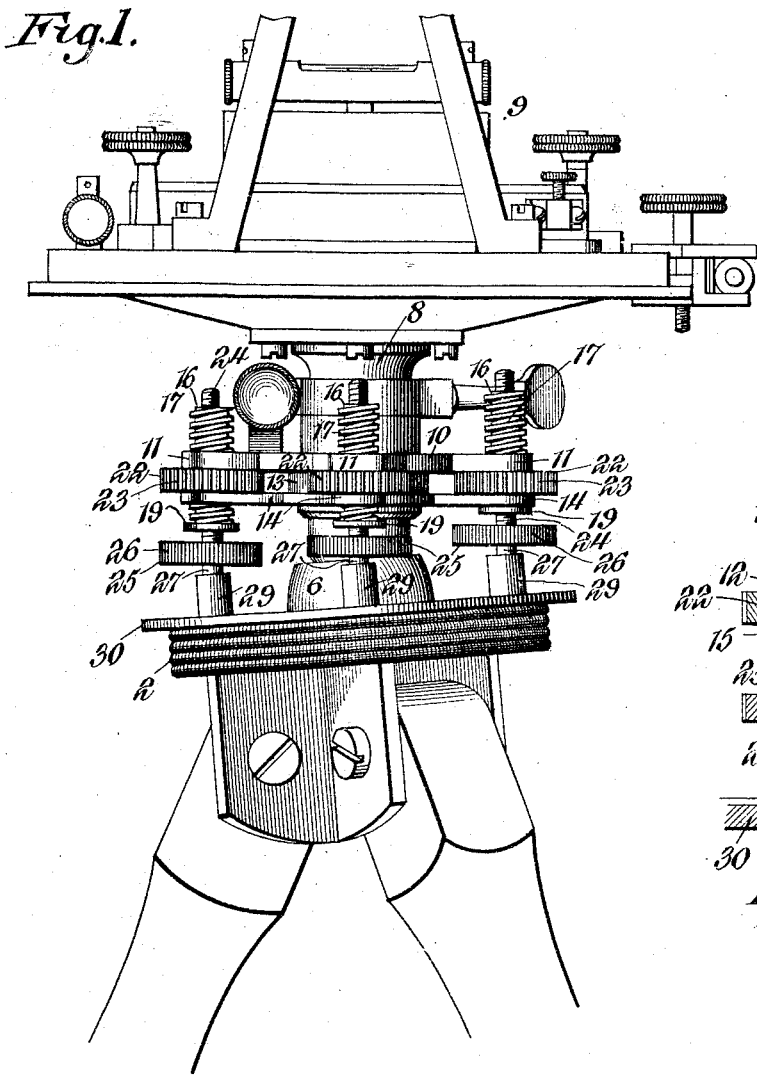

J. S. FRYE.
TIME SAVING LEVELER AND ADJUSTER.
APPLICATION FILED MAY 24, 1915.

1,182,472.

Patented May 9, 1916.
2 SHEETS—SHEET 1.

WITNESSES:
Howard D. Orr.
J. T. Chapman

Jason S. Frye, INVENTOR,

BY E. G. Siggers

Attorney

J. S. FRYE.
TIME SAVING LEVELER AND ADJUSTER.
APPLICATION FILED MAY 24, 1915.
1,182,472.
Patented May 9, 1916.
2 SHEETS—SHEET 2.
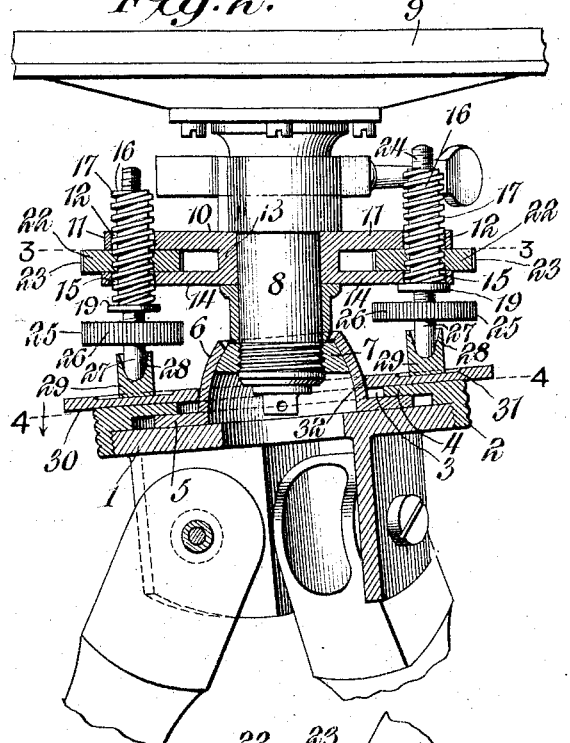
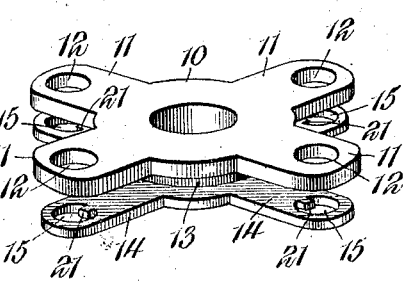
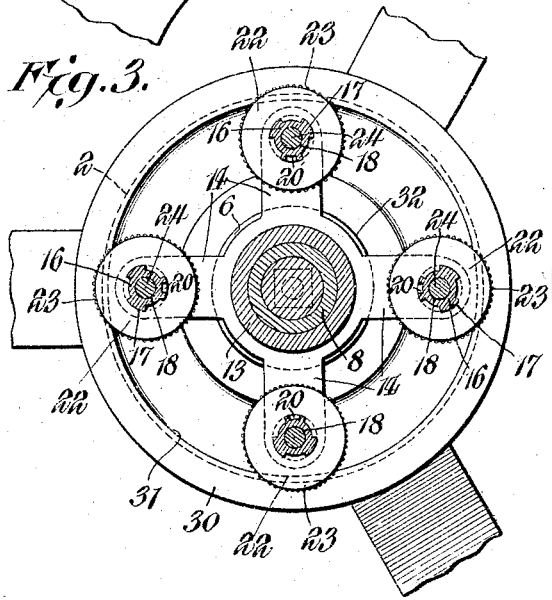
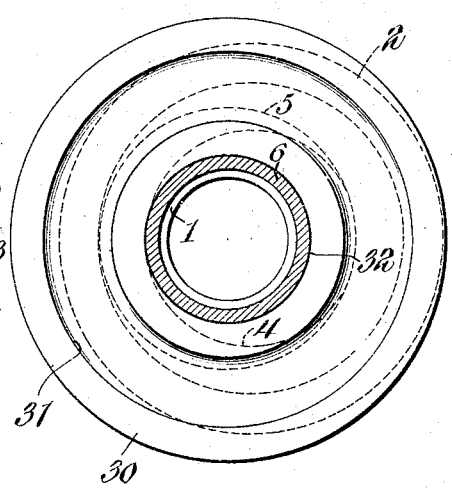
WITNESSES:
Howard D. Orr.
F. T. Chapman
Jason S. Frye, INVENTOR,
BY E. G. Siggers.
Attorney

UNITED STATES PATENT OFFICE.

JASON SAMUEL FRYE, OF DOWNIEVILLE, CALIFORNIA.

TIME-SAVING LEVELER AND ADJUSTER.

1,182,472.   Specification of Letters Patent.   Patented May 9, 1916.

Application filed May 24, 1915. Serial No. 30,115.

*To all whom it may concern:*

Be it known that I, JASON S. FRYE, a citizen of the United States, residing at Downieville, in the county of Sierra and State of California, have invented a new and useful Time-Saving Leveler and Adjuster, of which the following is a specification.

This invention has reference to means for leveling or adjusting, and its object is to provide a means whereby an article or device may be quickly brought into a condition of true level by first approximating such condition by quick-acting devices and completing the attainment of the condition by slow acting devices.

Where it is desirable to attain an accurate condition of level from an out-of-level position, it is customary to employ slow acting means whereby a relatively great extent of manipulating movement brings about but a relatively small degree of movement in the object being leveled. The reason for this is that the great diminution of movement between the point of actuation and the object being leveled makes it possible to obtain extreme accuracy in the leveling operation.

It is customary to employ leveling screws of fine pitch for such purpose, but it often happens that the extent of adjustment necessary is sufficiently great to demand many rotations of one or more of the screws to bring about the desired result. When such adjustments are performed at frequent intervals the time consumed in attaining the adjustments becomes very material.

By the present invention the object to be leveled is moved from the out-of-level position to a close approximation to the level position very quickly and in a minimum of time, after which the completion of the leveling to a point of extreme accuracy is performable in a correspondingly short time. Such an arrangement is of value where the operation of leveling is performed at frequent intervals and the out-of-level position is as frequently variable.

While the present invention is of wide adaptability it has particular value in connection with surveying instruments such as transits, levels, plane-tables, compasses, and the like, and for convenience of description it will be considered that the invention is applied to a surveyor's transit without, however, in any manner confining the invention to such particular use.

In field work the transit is frequently set up and leveled and then moved to another station while the ground or support upon which the transit tripod is placed may be such as to make it difficult to attain to a close approach to a level position. Nor with the present invention is it necessary to take any particular care to initially approach the level position so long as the head of the tripod does not tilt beyond the range of the leveling devices.

In accordance with the invention leveling screws of fine pitch are employed in conjunction with other screws of coarse pitch carrying the fine pitch screws and so arranged that a quick approximation to the desired level condition is obtained by a manipulation of the coarse pitch screws constituting the coarse adjustment of the instrument and the attainment of accuracy of adjustment is due to the manipulation of the fine pitch screws. Such fine pitch screws may be the customary leveling screws, such as are employed in surveying instruments and they may be similarly disposed. The coarse pitch screws are in the form of bushings through which the fine pitch screws are threaded and which bushings are movable in a direction lengthwise of the fine pitch screws by means of nuts applied to the exterior of the bushings which are usually supplied with coarse threads; that is, threads of relatively long pitch as compared with the pitch of the other screws.

In conjunction with the leveling screws there is provided what may be termed a non-crawl plate against which the leveling screws bear and which in turn bears against and is laterally adjustable on the base plate of the instrument.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 6:
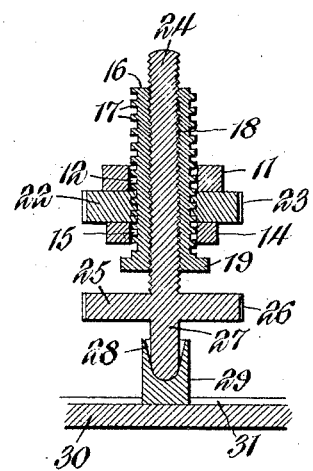
Figure 7:
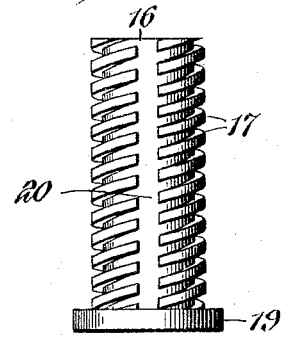

In the drawings:—Figure 1 is an elevation of a surveyor's transit with the upper portion of the transit and the lower portion of the tripod omitted. Fig. 2 is a view similar to Fig. 1 but showing the portion of the instrument including the present invention in vertical cross-section. Fig. 3 is a section on the line 3—3 of Fig. 2. Fig. 4 is a section on the line 4—4 of Fig. 2. Fig. 5 is a perspective view of a spider for carrying the adjusting screws. Fig. 6 is an axial section through one of the adjusting screws and coacting parts. Fig. 7 is an elevation of one of the bushings on a larger scale than the other figures.

Referring to the drawings there is shown a tripod head 1 having a peripheral nut 2 applied thereto, said nut constituting the base plate of the transit and is provided with a central opening 3 around which the nut is in the form of an overhanging flange 4 directed toward the center of the nut or base plate and arranged to confine an annular flange 5 on a shell 6 against the head 1, so that the shell 6 may be shifted laterally of the base plate 2 and head 1, as is customary in surveying instruments of the character illustrated.

The shell 6, which is of frusto semi-spherical form, constitutes one member of a ball and socket joint, the other member being formed by a nut 7 of suitable shape applied to what constitutes the lower end of a spindle or stem 8, which latter at the upper end carries a transit instrument 9. Since such transit instrument is of customary form and in itself is no part of the present invention, it is not deemed necessary to either show or describe it in detail. Furthermore, the instrument 9 may be taken as indicative of not only a transit, but a compass or a plane-table or any other instrument of like character.

Mounted at a suitable point on the spindle 8 is a spider 10 shown in the drawings as a four arm spider, the arms being indicated at 11 and each provided with a passage 12 therethrough. The spider 10 has an axially extended hub 13 carrying arms 14 matching but spaced from the arms 11 and each arm 14 has a passage 15 therethrough alining with the passage 12 of the corresponding arm 11.

Extending through each pair of alined passages 12 and 15 is an elongated bushing 16 having exterior screw threads 17 of coarse pitch. The bushing is provided with an axial passage 18 with screw threads of fine pitch and one end of the bushing has a laterally offset flange 19. Extending lengthwise of the bushing and exterior thereto is a channel 20 in which is seated a lug or projection 21 in the corresponding passage 15. The lug is in the nature of a key or spline and the channel 20 serves as a keyway whereby the bushing may slide lengthwise through the passages 12 and 15, but is held by the lug or key against rotative movement about its longitudinal axis.

Applied to each bushing 16 between the respective arms 11 and 14 is a nut 22 usually circular and having a milled periphery 23 by means of which the nut is readily manipulated. The nut 22 is of such diameter as to project beyond the respective arms 11 and 14 into convenient position to be grasped by the fingers of the hand of the operator. On turning the nut 22 the bushing 16 is caused to move lengthwise in one direction or the other, the extent of such movement being limited in one direction by the flange 19 and in the other direction by parts of the instrument.

Threaded through the passage 18 is the correspondingly threaded stem of a screw 24 having near one end a manipulating head 25 usually of flat circular form with a milled periphery 26. The stem 24 has a continuation 27 on the side of the head 25 remote from the stem of the screw and the continuation 27 is usually rounded at its extremity to fit an expanding cavity 28 in a shoe block 29.

Applied to the base plate 2 is an annular plate or ring 30 having on the face remote from the base plate a shallow annular channel 31 so located as to receive the shoes 29. The plate 30 has a central passage 32 of a size to snugly yet freely fit the exterior of the shell 6, so that the plate, which is of sufficient diameter to project beyond the margins of the base plate 2, constitutes a manipulating means whereby the base plate and parts carried thereby may be placed in concentric relation or in any degree of eccentricity to the head 1 of the tripod. Such lateral adjustment of the working parts of the instrument with relation to the tripod is customary on instruments of this character, and is designed to permit the proper placing of the instrument over a center or station in the operation of surveying.

The screws 24 may be such as are customarily employed as leveling screws in surveying instruments, and these screws usually have threads ranging from 28 to 32 to the inch. The bushings 16 are screws of far steeper pitch and in a practical form of the invention these screws are given a pitch of about three to the inch and may be of the multi-thread type. The result is that the screws 24, which are carried by the bushings 16, may each be moved by a single complete turn of the nut 22 approximately ten times as far as the screws are moved by a single complete turn of the head 25. These proportions are given by way of example and not as confining the invention to any such particular proportions, since it will be understood that the proportions may vary within quite wide limits, but in any event the utility of the invention demands that the progressive movement of the bushings per turn should materially exceed a progressive movement of the fine adjustment of the screw per turn. The bushings each constitute a rapid or quick adjustment customarily termed a coarse adjustment, while the screws 24 provide a slow adjustment commonly known as a fine adjustment, whereby a manipulating movement of the head 25 through a certain distance produces a relatively minute progressive movement of the screw 24 while the same movement of the nut 22 may impart to the bushing 16 a progressive movement many times that of the screw 24.

Let it be assumed that the transit is about parallel with the tripod head 1 and that it is desirable to set up the instrument. The tripod is located on such support as may be present and this support may be such that the tripod is very nearly level. The operator can see at a glance that very little adjustment is needed and this adjustment may be brought about by a fractional turn of one or more of the nuts 22 or of the heads 25, although usually it is not necessary to use the heads 25 except for the finer adjustment to obtain extreme accuracy of level. Suppose, however, that the tripod head 1 is set up quite out of level, then the operator has no difficulty in noting such fact, and by manipulating the nuts 22 in the customary manner of leveling the instrument, one or two turns of one set or more of the nuts 22 and more often only a fractional turn thereof is sufficient to bring the working parts of the instrument into close approximation to the level condition indicated at the usual levels with which the instrument is provided.

Because of the coarseness of the adjustment provided for by the bushings 16, the leveling of the instrument can at best be only approximate, while for extreme accuracy the fine adjustment is then utilized and such fine adjustment permits the same degree of accuracy of leveling that is accomplished with surveying instruments as customarily constructed.

Even with the coarse pitch of the exterior threads of the bushings the weight of an instrument such as a surveyor's instrument is insufficient to impart any rotative movement to the nuts 22, and hence these nuts remain in place and might of themselves provide efficient locks were it not for the presence of the screws 24, the latter not only providing for the final accuracy of adjustment, but also serving to force the shoes 29 against the plate 30 and the latter against the base plate 2, so that all the parts are then firmly locked against accidental displacement.

In field work a surveying instrument such as a transit is frequently set up, the levels taken, and then moved to another station. At each station the leveling must be repeated and with the ordinary arrangement of fine pitch leveling screws considerable time must be taken to turn the screws sufficiently to bring the parts again to a level. Sometimes the tripod must be set considerably out of level, and where fine pitch screws only are provided it sometimes happens that the screws are run out without the level condition being reached, whereupon the tripod must be reset and the screws reversed until run back and the operation of leveling repeated. All this is tedious and time consuming and necessitates the entire force waiting upon the instrumentman.

With the present invention the approximation to a level condition is brought about in seconds rather than minutes. Moreover, there is no need of the instrumentman taking any particular care in setting up the tripod to approach as near as possible to a level condition, since the adjustments are so quickly performed that it is quite immaterial whether the tripod approach closely to a level position or whether it varies considerably therefrom even to the extent of requiring a resetting of the tripod. In fact, it is in a manner advantageous to have the tripod set sufficiently out of level so that the instrumentman may at a glance ascertain which direction the parts must be moved toward the level position.

By mounting the fine adjustment leveling screws in coarse adjustment bushings the manipulating parts are brought into close relation and can be reached and actuated without any material movement of the hands of the operator.

In the ordinary surveying instrument when the base plate is tilted at a high angle and the leveling screws are being manipulated, the bottom surface of the shoes are so small and their position is so much disturbed by the revolution of the screws that there is a strong tendency for the instrument to "crawl" toward the lower side of the base plate and hence move off the center point of the survey station. Such tendency is present in all surveying instruments of the general character of that shown in the drawings and is a very annoying condition. The tendency is wholly overcome by the presence of the plate 30 which is a light plate connected to the laterally adjustable part of the instrument so as to act as a part of the latter. Hence the screws have no tendency to crawl on the base plate and the manipulation of the leveling screws does not tend to move the plate, since the weight of the instrument rests in part upon two of the screws, while the other two are being manipulated. Since one part of the plate cannot move without the whole plate any shifting or crawling tendency is wholly done away with, for the surface of the plate is quite large compared with the areas on the bottoms of the shoes, and within the limit of tilt of the entire leveling device there is not enough superimposed weight to cause the plate 30 to slip on the base plate.

The invention has been described in particular with reference to a surveying instrument, and it is of particular value in connection with such instrument, but the invention likewise has value in other connections where frequent leveling is desired and where the saving in time of manipulation is of moment.

No claim is made herein to the broader features of the invention, since such claims are to be found in another application filed by me on even date herewith and entitled Leveling and adjusting means.

What is claimed is:—

1. A means for leveling an object upon a support, comprising two members interposed between the object and the support and movable along the same axis, each member having screw threads of different pitch from the other, and means for the separate actuation of either member to simultaneously feed both members at a rate of linear speed corresponding to the pitch of the threads of the actuated member.

2. A means for leveling, comprising a rotatable screw of relatively fine pitch combined with a bushing through which the screw is threaded lengthwise, said bushing having exterior screw threads of relatively coarse pitch as compared with those of the screw, means for holding the bushing against rotation, and a feed nut on the threaded exterior of the bushing for imparting lengthwise movement to the bushing and the screw carried thereby.

3. A means for leveling, comprising a screw of relatively fine pitch having means for imparting rotative movement to the screw, combined with an elongated bushing through which the screw is threaded lengthwise with said bushing having exterior screw threads of relatively coarse pitch as compared with those of the screw, means for holding the bushing against rotation, and a nut applied to the threads on the exterior of the bushing and rotatable for causing lengthwise movement of the bushing together with the screw carried thereby, and said nut having means associated therewith for holding it against participation in the lengthwise movements of the bushing.

4. A means for rapidly leveling an object upon a support, comprising a bushing having exterior screw threads of long pitch and interior screw threads of short pitch as compared with the exterior screw threads, holding means for the bushing coacting therewith to hold the bushing against rotation and through which the bushing is movable longitudinally of the latter, a nut on the exterior of the bushing and rotatably carried by the holding means against longitudinal movement therein, and a screw having its threads matching those on the interior of the bushing and extending lengthwise of the bushing, said screw having means for imparting rotative movements thereto and having one end formed into a thrust bearing.

5. A means for rapidly leveling an object upon a support, comprising an elongated bushing having exterior threads of long pitch and interior threads of short pitch as compared with the pitch of the exterior threads, a carrying means for the object to be leveled traversed by the bushing, and said bushing and carrying means having coacting parts holding the bushing against rotation in the carrying means, a nut engaging the carrying means and surrounding the bushing in engagement with the exterior threads thereof for causing relative movements between the bushing and carrier in a direction lengthwise of the bushing, and a screw having threads of relatively fine pitch corresponding to the interior threads of the bushing and engaging the latter, said screw being provided with actuating means near one end and a thrust bearing on the side of the actuating means remote from the bushing.

6. A means for rapidly leveling an object upon a support, comprising an elongated bushing having exterior threads of long pitch and interior threads of short pitch as compared with the pitch of the exterior threads, a carrying means for the object to be leveled traversed by the bushing, and said bushing and carrying means having coacting parts holding the bushing against rotation in the carrying means, a nut engaging the carrying means and surrounding the bushing in engagement with the exterior threads thereof for causing relative movements between the bushing and carrier in a direction lengthwise of the bushing, and a screw having threads of relatively fine pitch corresponding to the interior threads of the bushing and engaging the latter, said screw being provided with actuating means near one end and a thrust bearing on the side of the actuating means remote from the bushing, said screw being also provided with a shoe receiving the thrust end of the screw.

7. A surveying instrument provided with a support and means carried by the support, and leveling means interposed between the first-named means and the support, comprising a spider connected to the first-named means, a series of exteriorly and interiorly threaded bushings on the spider relatively movable therein lengthwise of the bushings with said bushings and spider co-actively formed to hold the bushings against rotative movements about their longitudinal axes, manipulating nuts on the bushings in coactive engagement with the spider to move the spider lengthwise of the bushings by rotative movements of the nuts, and screws each individual to a respective bushing and engaging the interior threads thereof, each screw being provided with a manipulating portion and the screws having the pitch of their threads relatively fine as compared to the pitch of the threads on the exterior of the bushings, whereby an approximate level of the portion of the surveying instrument to be leveled is quickly attained by movements of the bushings while the final accuracy of leveling is attained by relatively slower movements of the screws.

8. In a surveying instrument, the combination with a support and a part of the surveying instrument to be leveled, of leveling means interposed between the support and the part to be leveled, comprising a series of members each composed of two associated elements movable along the same axis and each element having screw threads of different pitch from those of the other element, and means associated with said elements for the separate actuation of either element to simultaneously feed both elements at a rate of linear speed corresponding to the pitch of the threads of the actuated element.

9. A surveying instrument comprising a basic member, a head mounted thereon and movable with respect to the basic member to bring the head into a level position, and means interposed between the head and basic member for effecting the leveling, comprising a plate mounted on and movable laterally of the base plate, and a series of pairs of leveling screw members, each pair comprising a bushing with exterior threads of coarse pitch and interior threads of fine pitch as compared with the exterior threads, and a screw having its threads matching the fine threads of the bushing and engaging said threads, the bushing and screw being movable simultaneously in the same direction and separately in either direction along the same axis and each provided with actuating means individual thereto.

10. A surveying instrument comprising a basic member, a head mounted thereon and movable with respect to the basic member to bring the head into a level position, and means interposed between the head and basic member for effecting the leveling, comprising a plate mounted on and movable laterally of the base plate, and a series of pairs of leveling screw members, each pair comprising a bushing with exterior threads of coarse pitch and interior threads of fine pitch as compared with the exterior threads, and a screw having its threads matching the fine threads of the bushing and engaging said threads, the bushing and screw being movable simultaneously in the same direction and separately in either direction along the same axis and each provided with actuating means individual thereto, the screws having shoes interposed between them and the plate engaging the base plate of the instrument.

In testimony that I claim the foregoing as my own I have hereto affixed my signature in the presence of two witnesses.

JASON SAMUEL FRYE.

Witnesses:
ELIPHALET LEWIS CASE,
MARK NORMAN ALLING.

Copies of this patent may be obtained for five cents each, by addressing the "Commissioner of Patents, Washington, D. C."